United States Patent [19]

Fogt et al.

[11] Patent Number: 4,526,828
[45] Date of Patent: Jul. 2, 1985

[54] PROTECTIVE APPAREL MATERIAL AND METHOD FOR PRODUCING SAME

[75] Inventors: Kenneth E. Fogt; James D. Slosser; John A. Varos, all of Willard; Gopinath Radhakrishnan, Tiffin, all of Ohio

[73] Assignee: Pioneer Industrial Products Company, Willard, Ohio

[21] Appl. No.: 508,231

[22] Filed: Jun. 27, 1983

[51] Int. Cl.³ .................... A41D 19/00; D03D 15/00
[52] U.S. Cl. ............................................ 428/229; 2/7; 2/16; 2/22; 2/48; 2/102; 2/161 R; 2/167; 2/168; 36/2 R; 156/212; 156/278; 156/305; 156/307.3; 156/307.7; 156/316; 156/319; 428/247; 428/253; 428/902; 428/911
[58] Field of Search ............... 2/7, 16, 22, 48, 102, 2/161 R, 167, 168; 36/2 R; 156/212, 278, 305, 307.3, 307.7, 316, 319; 428/229, 247, 253

[56] References Cited

U.S. PATENT DOCUMENTS

| | | |
|---|---|---|
| 2,657,391 | 11/1953 | Crandon . |
| 3,883,898 | 5/1975 | Byrnes, Sr. . |
| 4,004,295 | 1/1977 | Byrnes, Sr. . |
| 4,172,293 | 10/1979 | Vistins ...................................... 2/169 |
| 4,218,779 | 8/1980 | Hart et al. . |
| 4,359,783 | 11/1982 | Andrews . |

OTHER PUBLICATIONS

"National Safety News," Jun., 1983, p. 84, advertisement for Bettcher Industries, Inc.

Primary Examiner—James C. Cannon
Attorney, Agent, or Firm—Marshall, O'Toole, Gerstein, Murray & Bicknell

[57] ABSTRACT

A protective material for use in articles of apparel such as golves, leggings, sleeves, aprons and the like. The protective material comprises a base layer composed of textile material, an intermediate layer composed of a cut-resistant material having intermeshing strands defining pores therebetween and an outer layer composed of solid, elastomeric material which retards penetration by liquid. The elastomeric material covers and is bonded to the base layer which prevents passage entirely therethrough by liquid, elastomeric material but permits partial penetration. The solid, elastomeric material extends through the pores of the intermediate layer and encapsulates the strands thereof. A method for producing the protective material comprises dipping an article composed of base layer and intermediate layer into a bath of liquid, elastomeric material preferably after absorbing into the base layer a coagulant for the liquid elastomeric material.

15 Claims, 3 Drawing Figures

PROTECTIVE APPAREL MATERIAL AND METHOD FOR PRODUCING SAME

BACKGROUND OF THE INVENTION

The present invention relates generally to material used in the production of apparel and more particularly to protective material used in the production of gloves, leggings, aprons and the like, and to methods for producing this protective material.

A cut-resistant material has been developed for use in the manufacture of apparel, such as gloves, sleeves, leggings or aprons, worn by people engaged in meat-cutting operations, for example. This material is composed of woven or knitted intermeshing strands composed of aramid fiber (see Byrnes U.S. Pat. No. 3,883,898) or of an aramid fiber or other fiber exterior encapsulating a spine composed of metallic wire such as stainless steel.

The machinery on which this cut-resistant material is woven or knitted produces a relatively coarse knit, and the pores or openings defined by the intermeshing strands are sufficiently large to permit the passage therethrough of liquids or of sharp pointed objects. Thus, a person wearing an article of apparel composed of this material is not protected from reactive liquids or sharp pointed objects. Moreover, the cut-resistant material is relatively slippery and permits objects grasped by a person wearing gloves composed of this cut-resistant material to slip through the grasp of that person.

Open pores and slipperiness are drawbacks not present in apparel made from rubber or other elastomeric material. Therefore, attempts have been made to apply a coating of rubber on the exterior of the item of apparel composed of the cut-resistant material, but the fiber of which this material is composed does not readily bond to the rubber.

A conventional procedure for coating articles with elastomeric material is to dip the article into a bath of liquid elastomeric material (see Hart et al. U.S. Pat. No. 4,218,779). However, when the article of apparel composed of said cut-resistant material is dipped into liquid elastomeric material, the liquid elastomeric material drops through the large pores between the intermeshing strands of the cut-resistant material and leaves holes in the rubber coating on the cut-resistant material.

SUMMARY OF THE INVENTION

The problems which arose when attempts were made to cover the cut-resistant material with a layer of rubber have been eliminated by the present invention. A protective material in accordance with the present invention comprises three layers: a base layer of textile material; an intermediate layer composed of the relatively cut-resistant fiber material described above; and an outer layer of solid, elastomeric material which retards penetration by liquid. As noted previously, the pores in the cut-resistant material of the intermediate layer are sufficiently large to permit the passage therethrough of liquid elastomeric material. The base layer, however, is sufficiently non-porous to prevent the passage entirely therethrough of liquid elastomeric material while allowing partial penetration thereof for bonding purposes. The solid, elastomeric material is bonded to the base layer, extends through and fills the pores in the intermediate layer and encapsulates the strands of the intermediate layer.

To produce an article of apparel composed of the protective material of the present invention, the following procedure is followed. An article made from the base layer is conformed to a predetermined shape, dictated by the shape of the article of apparel (such as a glove) by mounting the base layer on a mold (e.g., in the shape of a hand in the case of a glove). An article made from the intermediate layer of material (e.g., a glove) is mounted exteriorly of the base layer to conform the shape of the intermediate layer to the shape of the underlying base layer. The mold, on which the two layers are mounted, is then dipped into a bath of liquid elastomeric material which may be preceded by a pre-dip into a coagulant for the liquid elastomeric material. The mold is held in the liquid elastomeric material for a time sufficient to permit the liquid elastomeric material to flow through the pores in the intermediate layer to cover the base material, fill the pores in the intermediate layer, and encapsulate the strands of the intermediate layer with the elastomeric material. The mold is then removed from the liquid elastomeric material, and the latter is allowed to solidify so as to bond it to the base layer while the elastomeric material covers the base layer, fills the pores in the intermediate layer and encapsulates the strands in the intermediate layer.

The base layer is composed of a textile material capable of bonding to the elastomeric material and preferably also having sufficient absorbency to hold a coagulant for the liquid elastomeric material.

Other features and advantages are inherent in the protective material and method claimed and disclosed or will become apparent to those skilled in the art from the following detailed description in conjunction with the accompanying diagrammatic drawing.

DETAILED DESCRIPTION

Figure 1:
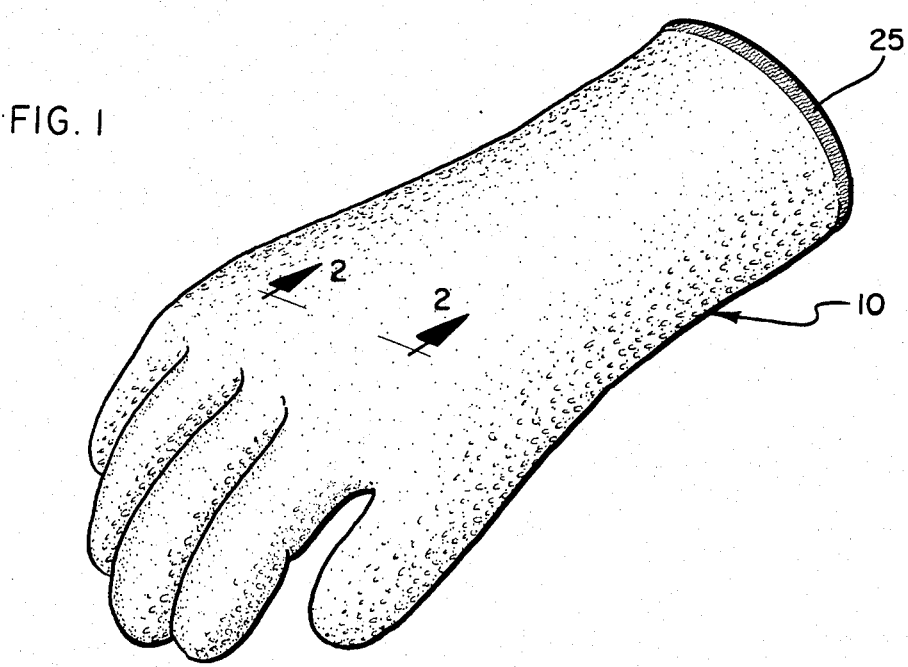
FIG. 1 is a perspective of a glove composed of a protective material in accordance with the present invention.

FIG. 1 illustrates a glove indicated generally at 10 and composed of a protective material in accordance with the present invention. In addition to gloves, the protective material may be utilized for producing other articles of protective apparel, such as leggings, arm coverings, aprons, vests and the like and for articles other than apparel which can advantageously utilize the features of the protective material. The protective material is illustrated in FIGS. 2 and 3 and comprises a base layer 12 of textile material, an intermediate layer 14 of relatively cut-resistant fiber material and an outer layer 15 of solid, elastomeric material impervious to liquid.

Base layer 12 is formed from intermeshing strands 16, 17 defining relatively small openings or pores 20 therebetween. Intermediate layer 14 is formed from intermeshing strands 18, 19 defining relatively large pores 21 therebetween. The size of the strands and pores shown in FIGS. 2 and 3 is exaggerated for clarity of illustration. Pores 21 in intermediate layer 14 are sufficiently large to permit the passage therethrough of the elastomeric material when the latter is in a liquid state. Pores 20 in base layer 12 are sufficiently small to prevent the passage therethrough of the liquid elastomeric material.

Figure 2:
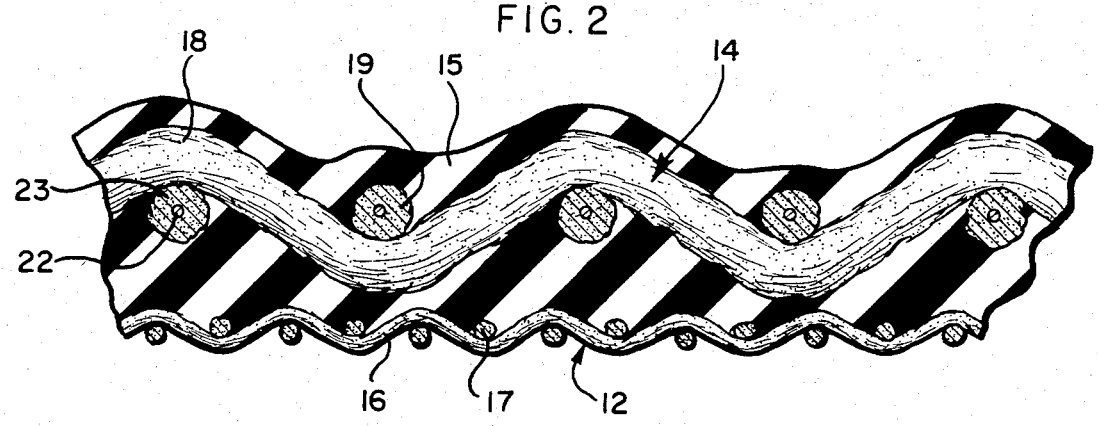
FIG. 2 is an enlarged sectional view taken along line 2—2 in FIG. 1.
Figure 3:
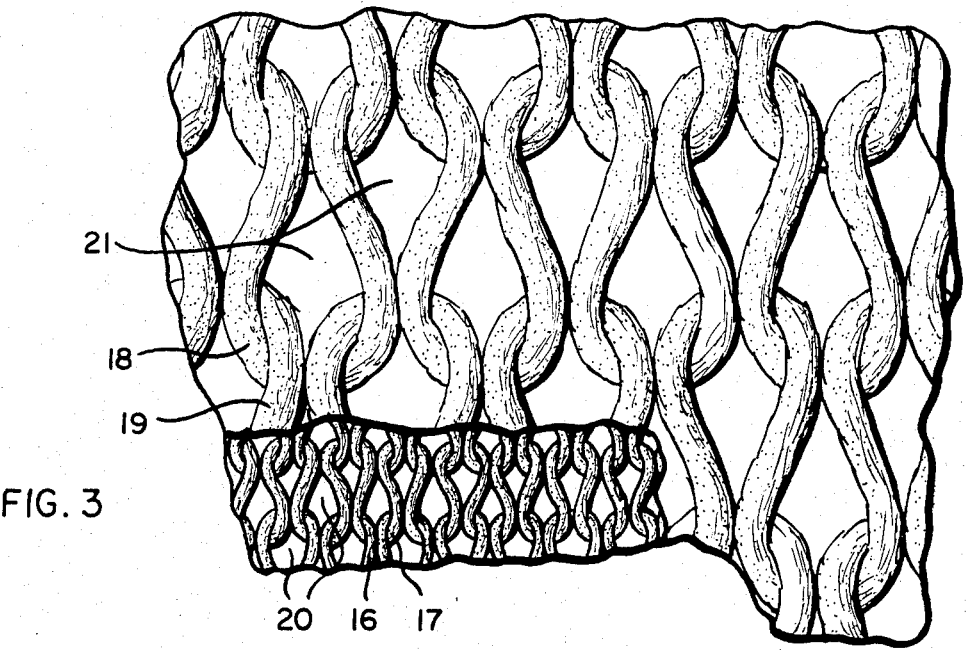
FIG. 3 is an enlarged, fragmentary plan view, partially cut away, of the protective material illustrated in FIG. 2.

The solid, elastomeric material is bonded to base layer 12, extends through and fills pores 21 in intermediate layer 14 and substantially totally encapsulates strands 18, 19 of intermediate layer 14 (FIG. 2). The elastomeric material constitutes a bond between base layer 12 and intermediate layer 14, and the elastic material is the predominant bond between the base layer and the intermediate layer except for sewing at cuff edge 25. The elastomeric material is preferably composed of acrylonitrile butadiene rubber. Polyvinyl chloride, polychoroprene, natural rubber or other elastomeric material may be used so long as they impart to the protective material an ability to retard penetration by liquid and provide it with non-slip gripping characteristics. Acrylonitrile butadiene is the preferred material for outer layer 15 because it has relatively high resistance to cutting, abrasion, oil, animal fats and the like.

The base layer is composed of a fiber material capable of bonding to the elastomeric material and preferably also having sufficient absorbency to hold a coagulant for the elastomeric material when the latter is in a liquid state. The coagulant converts the elastomeric material from the liquid to the solid state during the manufacturing operation for the protective material, as will be explained subsequently in more detail.

Cotton is the preferred material for base layer 12. Cotton has a fuzziness which assists in bonding the elastomeric material to the base layer, it has the absorbency for absorbing the coagulant for the liquid elastomeric material, and it is capable of being closely knitted so that the pores therein will not readily permit the passage entirely therethrough of the liquid elastomeric material but will allow partial penetration of the liquid elastomeric material to further assist in bonding the elastomeric material to the base layer. Base layer strands 16, 17 may also be composed of blends of fibrous material, such as a blend of cotton with 25% polyester or with wool and/or rayon or other material, so long as the base layer material has the ability to bond the elastomeric material to the base layer and preferably will also absorb a coagulant for the liquid elastomeric material.

With respect to intermediate layer 14, this layer imparts the basic cutting resistance to the protective material. The intermediate layer is sandwiched between the base layer and the outer layer.

In one embodiment, strands 18, 19 of intermediate layer 14 are composed of aramid fiber. In another embodiment strands 18, 19 are composed of an interior metallic spine 22 (e.g., stainless steel wire) and a non-metallic exterior 23 composed of textile fibers enclosing spine 22. The fiber of strand exterior 23 may be aramid or it may be other materials including blends. The other materials of which strand exterior 23 may be composed comprise polyester or a blend of cotton and polyester, for example. Increasing the cotton content of strand exterior 23 reduces the cut-resistance of strands 18, 19, and reducing the cotton content and replacing it with aramid increases their cut-resistance.

In all embodiments in accordance with the present invention, the pores 21 in intermediate layer 14 are sufficiently large to permit the passage therethrough of liquid elastomeric material so that an underlying base layer 12 in accordance with the present invention would be necessary to obtain the desired bond of outer layer 15 on the protective material.

A glove 10 (FIG. 1) composed of protective material in accordance with the present invention is produced in accordance with the method described below. An article of apparel such as glove 10 is knitted from the material of which base layer 10 is composed. The glove composed of base layer 12 is mounted on a mold in the shape of the glove or in the shape of a human hand. Another glove is prepared from the material of which intermediate layer 14 is composed, and the glove composed of the intermediate layer material is mounted on the outside of the glove composed of the base layer material. This conforms the shape of the glove composed of the intermediate layer material to the shape of the underlying glove composed of the base layer material. Then, the mold on which the base layer and intermediate layer are mounted is dipped into a bath of liquid elastomeric material.

As noted above, the base layer is preferably composed of material which will absorb a coagulating agent for the liquid elastomeric material, and, before the dipping step, such a coagulating agent is absorbed into the base layer, in a conventional operation for doing so, e.g., in a pre-dipping step. Accordingly, when the mold with the base layer and intermediate layer mounted thereon is dipped into the liquid elastomeric material the coagulating agent which was absorbed into the base layer acts to convert into a solid state the elastomeric material at the locations shown in FIG. 2. The coagulating agent may be any conventional coagulating agent heretofore used for the particular elastomeric material to be employed. Examples of conventional coagulants include calcium nitrate salt solution and a 10% solution of acetic acid in methanol.

The employment of a coagulating agent is preferred, but in some embodiments, it can be dispensed with; and a thicker liquid latex material is used than when coagulating agents are employed. The latex material air dries and solidifies without a coagulating agent, and in such an embodiment, the base layer material need not have the ability to absorb a coagulating agent for the liquid latex material.

The dipping step is conducted for a period of time which permits the liquid elastomeric material to flow through the pores in intermediate layer 14 to cover the base layer 12, fill the pores 21 in intermediate layer 14 and encapsulate strands 18, 19 in the intermediate layer.

The procedure is concluded by solidifying the liquid, elastomeric material and bonding it to the base layer while the elastomeric material covers and has partially penetrated the base layer, fills the pores in the intermediate layer and encapsulates the strands in the intermediate layer.

The resulting glove 10 is cut-resistant, retards penetration by liquids and has relatively good gripping characteristics.

The foregoing detailed description has been given for clearness of understanding only, and no unnecessary limitations should be understood therefrom, as modifications will be obvious to those skilled in the art.

We claim:

1. A protective material comprising:
a base layer of textile material;
an intermediate layer of relatively cut-resistant, fiber material formed from intermeshing strands, defining pores therebetween;
and an outer layer of solid, elastomeric material which retards penetration by liquid;

said pores in said intermediate layer being sufficiently large to permit the passage therethrough of said elastomeric material when the latter is in a liquid state;

said base layer being sufficiently non-porous to prevent the passage entirely therethrough of said elastomeric material when the latter is in a liquid state;

said solid, elastomeric material extending through said intermediate layer to bond the intermediate layer to said base layer, filling the pores in said intermediate layer and substantially totally encapsulating the strands of said intermediate layer.

2. A protective material as recited in claim 1 wherein:
said base layer is composed of fiber material capable of bonding to said elastomeric material.

3. A protective material as recited in claim 1 wherein:
said base layer is composed of fiber material having sufficient absorbency to hold a coagulant for said elastomeric material when the latter is in a liquid state.

4. A protective material as recited in claim 1 wherein:
said textile material of said base layer comprises at least a predominance of cotton.

5. A protective material as recited in claim 1 wherein;
said solid, elastomeric material partially penetrates said base layer to assist in the bonding thereof.

6. A protective material as recited in claim 5 wherein:
said elastomeric material is the predominant bond between the base layer and the intermediate layer.

7. A protective material as recited in claim 1 wherein said strands of said intermediate layer comprise:
an interior, metallic spine;
and a non-metallic, exterior composed of textile fibers enclosing said spine.

8. A protective material as recited in claim 1 wherein:
said elastomeric material comprises at least one of acrylonitrile butadiene rubber, polyvinyl chloride, polychoroprene and natural rubber.

9. A protective material as recited in claim 1 wherein:
said intermediate layer is sandwiched between said base layer and said outer layer.

10. An article of apparel composed at least in part of the protective material of claim 1.

11. A method for producing an article composed of protective material comprising a base layer of textile material, an intermediate layer of relatively cut-resistant fiber material, and an outer layer of solid, elastomeric material which retards penetration by liquid, said method comprising the steps of:
providing said base layer in the form of textile material which is sufficiently non-porous to prevent the passage entirely therethrough of said elastomeric material when the latter is in a liquid state and which will bond to the elastomeric material;
conforming said base layer to a predetermined shape dictated by the shape of said article;
providing said intermediate layer in a form having intermeshing strands defining pores therebetween sufficiently large to permit the passage therethrough of said elastomeric material when the latter is in a liquid state;
mounting said intermediate layer exteriorly to said base layer to conform the shape of said intermediate layer to the shape of the underlying base layer;
providing said elastomeric material in a liquid state;
dipping the base layer and mounted intermediate layer into said liquid elastomeric material;
said dipping step comprising flowing said liquid elastomeric material through said pores in said intermediate layer to cover said base layer, fill said pores and substantially totally encapsulate said strands with said elastomeric material;
and solidifying the liquid, elastomeric material and bonding it to said base layer while the elastomeric material covers the base layer, fills the pores in said intermediate layer and substantially totally encapsulates the strands in the intermediate layer.

12. A method as recited in claim 11 wherein:
said dipping step is conducted for a period of time which permits said liquid elastomeric material to flow through the pores in the intermediate layer to cover the base layer, fill the pores in the intermediate layer and encapsulate the strands in the intermediate layer with the elastomeric material.

13. A method as recited in claim 11 and comprising:
providing a coagulating agent for said liquid elastomeric material;
and absorbing said coagulating agent into said base layer before said dipping step.

14. A method as recited in claim 11 wherein said conforming steps comprise:
providing a mold having a predetermined shape dictated by the shape of said article;
mounting said base layer on said mold to conform the base layer to the shape of the mold;
and mounting said intermediate layer exteriorly of the base layer when the latter is on the mold.

15. A method as recited in claim 11 wherein:
said liquid elastomeric material partially penetrates said base layer.

* * * * *

UNITED STATES PATENT AND TRADEMARK OFFICE
CERTIFICATE OF CORRECTION

PATENT NO. : B1 4,526,828

DATED : April 4, 1989

INVENTOR(S) : Kenneth E. Fogt, et al.

It is certified that error appears in the above-identified patent and that said Letters Patent is hereby corrected as shown below:

Column 1, line 45, ";" should be "[.];"

lines 46-48, "[said . . . layer.]" should be deleted.

Column 2, line 29, should read "[and] solidifying . . ."

line 33, ";" should be "[.];"

lines 34-36, "[and . . . material.]" should be deleted.

Signed and Sealed this

Seventeenth Day of October, 1989

Attest:

DONALD J. QUIGG

Attesting Officer

Commissioner of Patents and Trademarks

Notice of Adverse Decisions in Interference

In Interference No. 102,402, involving Patent No. 4,526,828, K. E. Fogt, J. D. Slosser, J. A. Varos and G. Radhakrishnan, PROTECTIVE APPAREL MATERIAL AND METHOD FOR PRODUCING SAME, final judgment adverse to the patentees was rendered Feb. 26, 1991, as to claims 1-5 and 7-19.
*(Official Gazette September 3, 1991.)*

REEXAMINATION CERTIFICATE (1031st)
United States Patent [19]
Fogt et al.

[11] B1 4,526,828
[45] Certificate Issued Apr. 4, 1989

[54] PROTECTIVE APPAREL MATERIAL AND METHOD FOR PRODUCING SAME

[75] Inventors: Kenneth E. Fogt; James D. Slosser; John A. Varos, all of Willard; Gopinath Radhakrishnan, Tiffin, all of Ohio

[73] Assignee: Pioneer Industrial Products Company, Willard, Ohio

Reexamination Request:
No. 90/001,237, May 11, 1987

Reexamination Certificate for:
Patent No.: 4,526,828
Issued: Jul. 2, 1985
Appl. No.: 508,231
Filed: Jun. 27, 1983

[51] Int. Cl.⁴ .................... A41D 13/10; D03D 15/00
[52] U.S. Cl. ............................ 428/229; 2/7; 2/16; 2/22; 2/48; 2/102; 2/161 R; 2/167; 2/168; 36/2 R; 156/212; 156/278; 156/305; 156/307.3; 156/307.7; 156/316; 156/319; 428/247; 428/253; 428/902; 428/911
[58] Field of Search ............... 2/7, 16, 22, 48, 102, 2/161 R, 167, 168; 36/2 R; 156/212, 278, 305, 307.3, 307.7, 316, 319; 428/229, 247, 253, 902, 911

[56] References Cited
U.S. PATENT DOCUMENTS

| | | |
|---|---|---|
| 831,108 | 9/1906 | Ryder . |
| 2,864,091 | 12/1958 | Schneider . |
| 4,218,779 | 8/1980 | Hart et al. ............... 2/168 |
| 4,384,449 | 5/1983 | Byrnes, Sr. et al. . |

Primary Examiner—James C. Cannon

[57] ABSTRACT

A protective material for use in articles of apparel such as golves, leggings, sleeves, aprons and the like. The protective material comprises a base layer composed of textile material, an intermediate layer composed of a cut-resistant material having intermeshing strands defining pores therebetween and an outer layer composed of solid, elastomeric material which retards penetration by liquid. The elastomeric material covers and is bonded to the base layer which prevents passage entirely therethrough by liquid, elastomeric material but permits partial penetration. The solid, elastomeric material extends through the pores of the intermediate layer and encapsulates the strands thereof. A method for producing the protective material comprises dipping an article composed of base layer and intermediate layer into a bath of liquid, elastomeric material preferably after absorbing into the base layer a coagulant for the liquid elastomeric material.

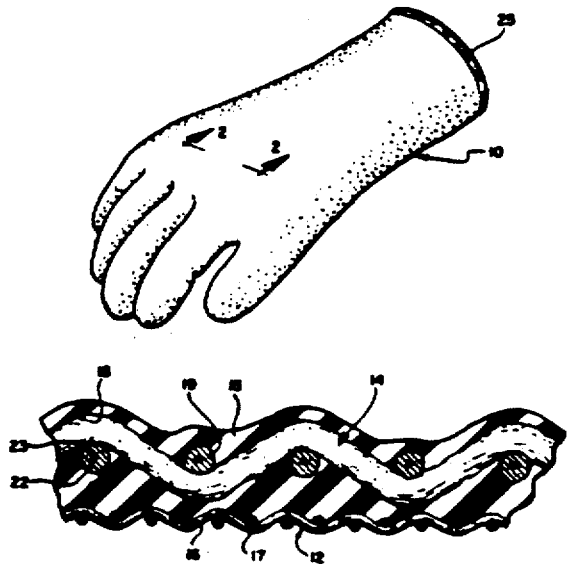

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERIMED THAT:

Claim 6 is cancelled.

Claims 1 and 11 are determined to be patentable as amended.

Claims 2-5, 7-10 and 12-15, dependent on an amended claim, are determined to be patentable.

New claims 16-19 are added and determined to be patentable.

1. A protective material comprising:
a base layer of textile material;
an intermediate layer of relatively cut-resistant, fiber material formed from intermeshing strands, defining pores therebetween,
an outer layer of solid, elastomeric material which retards penetration by liquid;
said pores in said intermediate layer being sufficiently large to permit the passage therethrough of said elastomeric material when the latter is in a liquid state;
said base layer being sufficiently nonporous to prevent the passage entirely therethrough of said elastomeric material when the latter is in a liquid state;
said solid, elastomeric material extending through said intermediate layer to bond the intermediate layer to said base layer, filling the pores in said intermediate layer and substantially totally encapsulating the strands of said intermediate layer;
[said elastomeric material being essentially the only bond between the base layer and the intermediate layer.]
*the bond between the base layer and the intermediate layer consisting essentially of said elastomeric material.*

11. A method for producing an article composed of protective material comprising a base layer of textile material, an intermediate layer of relatively cut-resistant fiber material and an outer layer of solid, elastomeric material which retards penetration by liquid, said method comprising the steps of:
providing said base layer in the form of textile material which is sufficiently nonporous to prevent the passage entirely therethrough of said elastomeric material when the latter is in a liquid state and which will bond to the elastomeric material;
conforming said base layer to a predetermined shape dictated by the shape of said article;
providing said intermediate layer in a form having intermeshing strands defining pores therebetween sufficiently large to permit the passage therethrough of said elastomeric material when the latter is in a liquid state;
mounting said intermediate layer exteriorly to said base layer to conform the shape of said intermediate layer to the shape of the underlying base layer;
providing said elastomeric material in a liquid state;
dipping the base layer and mounted intermediate layer into said elastomeric material;
said dipping step comprising flowing said liquid elastomeric material through said pores in said intermediate layer to cover said base layer, fill said pores and substantially totally encapsulate said strands with said elastomeric material;
solidifying the liquid, elastomeric material and bonding it to said base layer while the elastomeric material covers the base layer, fills the pores in said intermediate layer and substantially totally encapsulates the strands in the intermediate layer;
[and bonding said intermediate layer to said base layer essentially only with said elastomeric material.]
*the bonding between said intermediate layer and said base layer consisting essentially of said elastomeric material.*

*16. A protective material as recited in claim 1 wherein: said solid, elastomeric material covers said base layer.*

*17. A protective material as recited in claim 1 wherein: said outer layer is liquid impervious.*

*18. An article of apparel as recited in claim 10 wherein: said article is a glove having a cuff edge; and said base layer and said intermediate layer are sewn together solely at said cuff edge.*

*19. A method as recited in claim 11 wherein said article is a glove having a cuff edge and wherein said method comprises:*
*sewing said base layer and said intermediate layer together solely at said cuff edge.*

* * * * *